UNITED STATES PATENT OFFICE.

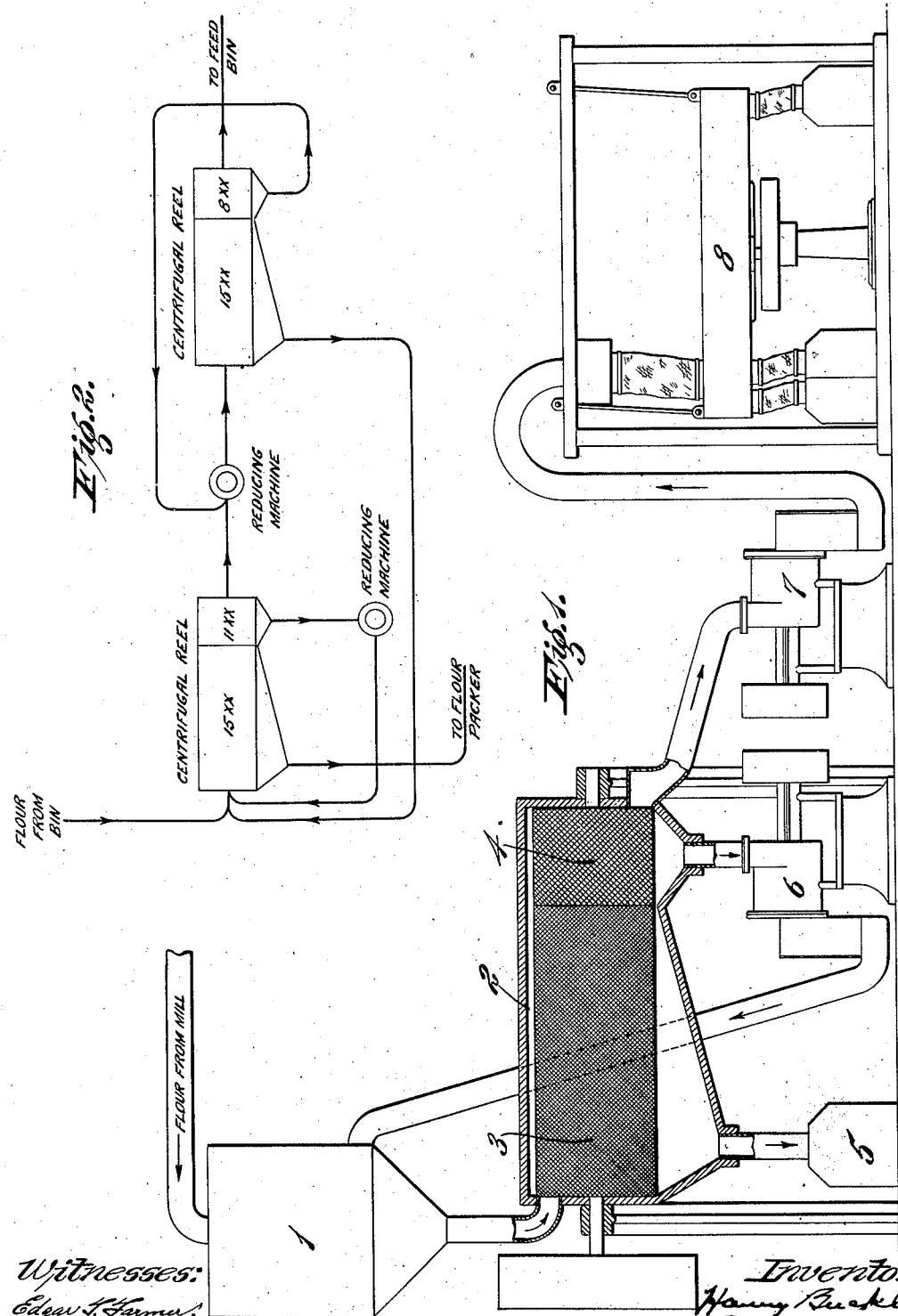

HARRY BUCKLEY, OF LOUISVILLE, KENTUCKY.

PROCESS FOR REFINING FLOUR.

1,091,284.

Specification of Letters Patent. Patented Mar. 24, 1914.

Application filed April 15, 1913. Serial No. 761,228.

*To all whom it may concern:*

Be it known that I, HARRY BUCKLEY, a citizen of the United States, and a resident of the city of Louisville and State of Kentucky, have invented new and useful Improvements in Processes for Refining Flour, of which the following is a specification.

This invention relates to the refining by mechanical treatment of finished flour of the grades commonly found on the market, and is applicable both in the mill at the time of making the flour, either in connection with the machinery used in making the flour or separately therefrom, and at any time thereafter in the same or any other mill.

The object of this invention is to produce from any grade of flour a whiter flour of more uniform texture, by a process which leaves the flour with its full gluten content and free from impurities.

A further object of the invention is to reduce the size of the coarser flour particles to that of the finer particles so that all the flour particles shall be of uniform fineness and smaller than the average size of the particles of the flour in its original condition.

A further object of this invention is to increase the mill output of "patent" or best grade flour by the improvement of all or nearly all of the flour produced in a mill so that it equals in color and quality the best grade formerly produced; whereby the mill is enabled to turn out a larger percentage of "patent" or best grade flour, and the production of twenty to thirty percent. of the clear and low grade flours produced in mills equipped and operated as heretofore is eliminated.

The process consists in rebolting flour made in the ordinary way on a finer cloth than the average mesh of the cloths on which the flour was originally made, then rebolting the portion of the flour which will not go through this fine cloth on a coarser cloth than the average mesh on which the flour was originally made, then reducing or pulverizing the portion of the flour that comes through this coarser cloth so that it will bolt through the fine cloth and sending it back into the stream entering the fine cloth for rebolting. The portion of the flour that goes over the coarse cloth is reduced or pulverized in suitable machinery and sent back into the main mill stream for scalping and further bolting before being again subjected to the treatment upon a fine cloth and coarse cloth, as above described.

A better understanding of this process may be obtained by reference to the drawing (Figure 1) and diagram (Fig. 2) accompanying this specification.

In the drawing the several devices and parts thereof are respectively designated by reference numerals by which they are referred to throughout the description.

Referring to the drawing (Fig. 1), the flour to be refined is conducted from the mill upon which it was made, or from a storage bin 1, to the head end of a centrifugal reel 2, or other suitable sifting or bolting device, clothed for the most part with a fine mesh bolting cloth 3, which is finer than the average mesh of the cloths in the mill on which the flour was originally made. The tail end of the reel or sifter 2 is clothed with a coarser cloth 4 than the average mesh of the cloth on which the flour was originally made. For example, No. 15XX and No. 11XX silk would be suitable cloths for a refining apparatus treating soft winter wheat flour. The flour which passes through the fine cloth 3 is finished flour and may be sent directly to the packer 5, or to a flour bin, or to a bleaching apparatus if the flour is to be bleached. The flour which passes through the coarse cloth 4 is further treated by passing it through the reducing and pulverizing machine described in my Patent, No. 1,060,739, dated May 6, 1913, for reduction to a size which will pass through the fine cloth 3; or it may be treated in any other machine which is capable of reducing or pulverizing the stock to this degree of fineness without shredding the fibrous content thereof. From the reducing machine 6 the flour is sent back to the head end of the reel or sifter 2 and the bolting process is repeated. The tailings passing through the reel or sifter 2 are sent to a machine 7 such as that described in my Patent No. 1,060,739, or to any machine which can make a reduction on this character of stock without shredding the fibrous matter therein contained, and then to the second middlings or other section 8 of sifter, or to the reel handling second or other middlings in the flour mill, to be scalped and bolted. The tailings from the reel or sifter 2 are thus reduced and separated, and returned to the mill to be further acted upon thereby. Whatever good flour is contained therein is sifted out and eventually reaches the bin 1 and is again sent through the finishing mechanism above described.

For refining flour by this process after it leaves the mill where it was made, an apparatus such as is illustrated diagrammatically in Fig. 2 may be used. The apparatus illustrated in Fig. 2 is similar to that shown in Fig. 1 and already described, except that a second centrifugal reel or other sifting device is required to handle the tailings from the first reel, in the place of the section 8 of sifter in the mill as shown in Fig. 1.

The tailings from the first reel, instead of going back into the mill for further treatment, are sent through the reducing machine or pulverizer and into the second reel. The head end of the second reel is clothed with a cloth of the same as or slightly coarser mesh than the cloth on the head end of the first reel, and the tail end of the second reel is clothed with a coarser cloth than that on the head end of this reel. The fine flour which passes through the fine cloth on the second reel is sent back to the first reel to be rebolted; and the coarse flour which passes through the cloth on the tail end of the second reel is sent through the reducing machine at the head end of the reel and rebolted in the second reel. The tailings from the second reel are sent to the feed bin.

In Fig. 2 the two reels are illustrated as clothed with Nos. 15XX and 11XX bolting cloth and 15XX and 8XX bolting cloth respectively, which cloths would be suitable for refining flour made from soft wheat. Cloth of other mesh or fineness may be used in refining flour made from other wheat, as will be readily understood by those familiar with milling. Whether carried out at the time of making the flour or later, the result of this process is, first, to put all of the flour in condition so that it bolts through a finer cloth than the average of the cloths on which it was originally made; and, second, to remove from the flour any strings, bugs or other foreign matter which may have crept into it, together with bran chips and other impurities which may have found their way into the flour through holes in bolting cloths or leaky sieves. Removing impurities and reducing the size of the flour particles make the flour whiter and improve its baking quality, and bolting the finished flour all through the same fine cloth makes it uniform.

The reduction of the flour particles to a small and uniform size assists in causing the flour to absorb water uniformly, and results in the production of a larger loaf of bread of better texture than one made from the same quantity of untreated flour. Moreover, flour refined by this process sours less quickly and holds its shape better in the process of baking than untreated flour, on account of the fact that the impurities removed by this process have a diastatic action on the flour and also interfere with the proper fermenting of the loaf in the baking.

Although this process has been described as carried out by means of machines of certain types, it is not restricted in its application to the machines described, but may be carried out by any suitable machines.

What I claim as my invention and desire to secure by Letters Patent is:

1. The process of refining flour which consists in rebolting all said flour on a finer cloth than the average mesh of the cloths on which said flour was originally made, rebolting the portion of the flour which will not go through said fine cloth on a coarser cloth than the average mesh of the cloths on which the flour was originally made, reducing the portion of the flour that comes through said coarser cloth and rebolting it on a cloth of the same fineness as said finer cloth, whereby substantially all said flour is bolted through cloths of the same degree of fineness.

2. The process of refining flour which consists in rebolting all said flour on a finer cloth than the average mesh of the cloths on which said flour was originally made, rebolting the portion of the flour which will not go through said fine cloth on a coarser cloth than the average mesh of the cloths on which the flour was originally made, reducing the portion of the flour that comes through said coarser cloth and rebolting it on a cloth of the same fineness as said finer cloth, reducing the portion of the flour that goes over the coarse cloth and returning it to the mill to be re-run, whereby all the refined flour is bolted through cloths of the same degree of fineness.

3. The process of refining flour which consists in bolting it upon a finer cloth than that upon which it was made and then upon a coarser cloth, treating the portion passed through the coarser cloth to reduce the size of its particles and rebolting said portion upon said finer cloth.

4. The process of refining flour made in a mill which consists in bolting it successively upon a fine cloth and a coarse cloth, treating the portion passed over the coarse cloth to reduce the size of its particles without shredding the fibrous content thereof, separating out said fibrous content and rebolting the remaining portion on some reel or section of sifter in the mill proper.

5. The process of refining flour which consists in bolting successively upon a fine cloth and a coarse cloth, treating the portion passed over the coarse cloth to reduce the size of its particles without shredding the fibrous content thereof, separating out said fibrous content and rebolting the remaining portion upon said fine cloth.

6. The process of refining flour which consists in passing it successively over a fine cloth and a coarse cloth, treating the portion which passes over the coarse cloth to reduce to flour the flour-making content thereof, separating the fibrous matter and dirt from the flour-making material, and returning the remaining portion, mingled with other flour, to said fine cloth to be bolted.

Signed at Louisville, Kentucky, this 10th day of April, 1913.

HARRY BUCKLEY.

Witnesses:
RAY BUCKLEY,
MARY LOUISE KANNAPELL.